US006249292B1

(12) United States Patent
Christian et al.

(10) Patent No.: US 6,249,292 B1
(45) Date of Patent: *Jun. 19, 2001

(54) TECHNIQUE FOR CONTROLLING A PRESENTATION OF A COMPUTER GENERATED OBJECT HAVING A PLURALITY OF MOVABLE COMPONENTS

(75) Inventors: Andrew D. Christian, Lincoln; Brian L. Avery, Lexington, both of MA (US)

(73) Assignee: Compaq Computer Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,037

(22) Filed: May 4, 1998

(51) Int. Cl.[7] .................................................. G06T 15/70
(52) U.S. Cl. ........................... 345/473; 345/474; 345/302
(58) Field of Search .................................. 345/473, 302, 345/474

(56) References Cited

U.S. PATENT DOCUMENTS

| 4,644,582 | 2/1987 | Morishita et al. ........................ 382/6 |
| 4,821,029 | 4/1989 | Logan et al. ........................... 340/712 |
| 4,851,616 | 7/1989 | Wales et al. ............................. 178/18 |
| 5,048,103 | 9/1991 | Leclerc ................................... 382/44 |
| 5,067,015 | 11/1991 | Combridge et al. ................. 358/133 |
| 5,105,186 | 4/1992 | May ...................................... 340/784 |
| 5,280,610 | 1/1994 | Travis, Jr. et al. ................... 395/600 |
| 5,376,947 | 12/1994 | Kurode ................................. 345/173 |
| 5,440,744 | 8/1995 | Jacobson et al. .................... 395/650 |
| 5,551,027 | 8/1996 | Choy et al. ........................... 395/600 |
| 5,581,758 | 12/1996 | Burnett et al. ....................... 395/614 |
| 5,630,017 | 5/1997 | Gasper et al. ...................... 395/2.85 |
| 5,640,558 | 6/1997 | Li ......................................... 395/612 |
| 5,652,880 | 7/1997 | Seagraves ............................ 395/614 |
| 5,652,882 | 7/1997 | Doktor ................................. 395/617 |
| 5,657,426 | 8/1997 | Waters et al. ...................... 395/2.85 |
| 5,873,057 | * 2/1999 | Eves et al. ........................... 704/201 |
| 5,880,731 | * 3/1999 | Liles et al. ........................... 345/349 |
| 5,923,337 | * 7/1999 | Yamamoto ........................... 345/473 |

OTHER PUBLICATIONS

Takeuchi et al ("Communicative Facial Displays as a New Controversial Modality": 1993 ACM 0-89791-575-5/93/0004/0187). 1993.*

(List continued on next page.)

*Primary Examiner*—Mark Zimmerman
*Assistant Examiner*—Mano Padmanabhan
(74) *Attorney, Agent, or Firm*—Cesari and McKenna LLP (57) ABSTRACT

A technique for controlling a presentation of a computer generated object having a plurality of movable components is disclosed. In one embodiment, the technique is realized by receiving a gesture element and an audio element at a processing device. The gesture element represents a gesture involving one or more of the plurality of movable components. The audio element represents an audio signal. The processing device receives the gesture element and the audio element in a sequential order. The processing device processes the gesture element and the audio element in the sequential order so that each of the plurality of movable components associated with the gesture element are moved to perform the gesture and the audio signal associated with the audio element is generated during a presentation of the computer generated object. The gesture can be performed and the audio signal can be generated simultaneously.

60 Claims, 6 Drawing Sheets

OTHER PUBLICATIONS

Rist et al ("Adding Animated Presentation Agents to the Interface": 1997 ACM 0–89791–839–8/96/01), 1997.*

Describing Motion for Recognition, Little, et al., 1995 IEEE, pp. 235–240.

Compact Representations of Videos Through Dominant and Multiple Motion Estimation, Sawhney, et al. IEEE 1996, pp. 814–830.

3D Human Body Model Acquisition from Multiple Views, Kakadiaris, et al., IEEE, 1995, pp. 618–623.

Analyzing Articulated Motion Using Expectation—Maximization, Rowley, et al. *Computer Vision and Pattern Recognition,* San Juan, PR, Jun. 1997, Total of 7 pages.

Mixture Modesl for Optical FLo9r Computation, Jepson, et al., University of toronto, *Depart of Computer Science,* Apr. 1993, pp. 1–16.

Analyzing and Recognizing Walking Figures in XYT, Niyogi, et al. IEEE 1994, pp. 469–474.

Nonparametric Recognition of Nonrigid Motion, Polana, et al, *Department of Computer Science,* pp. 1–29.

Model–Based Tracking of Self–Occluding Articulated Objects. Rehg. Et al., *5th Intl. Conf. on Computer Vision,* Cambridge, MA, Jun. 1995 total of 6 pages.

A Unified Mixture Framework For Motion Segmentation: Incorporating Spatial Coherence and Estimating The Number of Models, Weiss, et al., IEEE 1996, pp. 321–326.

Learning Visual Behaviour for Gesture Analysis, Wilson, et al. IEEE 1995, pp. 229–234.

Registration of Images with Geometric Distortions, Ardeshir Goshtasby, vol. 26, Jan. 1988, pp. 60–64.

The Integration of Optical Flow and Deformable Models with Applications to Human Face Shape and Motion Estimation, DeCarlo, et al IEEE 1996, pp. 231–238.

A Vision System for Observing and Extracting Facial Action Parameters, Essa, et al. IEEE 1994, pp. 76–83.

Realistic Modeling for Facial Animation, Lee, et al., *Computer Graphics Proceedings Annual Conference Series, 1995*pp. 55–62.

Facial Feature Localization and Adaptation of a Generic Face Model for Model–Based Coding, Reinders, et al. Signal Processings: Image Communication vol. 7, pp. 57–74, 1995.

Real–time Recognition of Activity Using Temporatl Templates, Aaron F. Bobick, et al. *The Workshop on Applications of Computer Vision*Dec. 1996, pp. 1–5.

* cited by examiner

TECHNIQUE FOR CONTROLLING A PRESENTATION OF A COMPUTER GENERATED OBJECT HAVING A PLURALITY OF MOVABLE COMPONENTS

FIELD OF THE INVENTION

The present invention relates generally to the field of computer generated modeling and, more particularly, to a technique for controlling a presentation of a computer generated object having a plurality of movable components.

BACKGROUND OF THE INVENTION

As is known in the art of computer animation and modeling, the DECface™ product developed by Digital Equipment Corporation provides a computer generated talking synthetic face. The DECface™ computer generated talking synthetic face is a visual complement to the DECtalk™ product, a speech synthesizer also developed by Digital Equipment Corporation. By combining the audio functionality of a speech synthesizer with the graphical functionality of a computer generated talking synthetic face, a variety of engaging user interfaces can be provided. Examples include internet-based agents capable of seeking and retrieving documents on the world-wide web, avatars for chat applications, and front-end interfaces for kiosks.

A technique for adaptively synchronizing an audio signal of a speech synthesizer with a facial image being displayed is described by Waters et al. in U.S. Pat. No. 5,657,426, entitled Method and Apparatus for Producing Audio-Visual Synthetic Speech, issued Aug. 12, 1997, assigned to the assignee of the present application, and hereby incorporated herein by reference. Waters et al. disclose a speech synthesizer that generates fundamental speech units called phonemes, which are converted into audio signals. The phonemes are also converted into visual facial configurations called visemes (i.e., distinct mouth postures). The visemes are grouped into sequences of mouth gestures approximating the gestures of speech. The sequences of mouth gestures are then synchronized to the corresponding audio signals.

While Waters et al. provide a technique for synchronizing audio speech with visual mouth gestures, other gestures, such as those associated with facial or other body movements, are not addressed. That is, Waters et al. do not address providing other gestures which typically accompany mouth gestures during speech.

Also, Waters et al. do not address providing gestures which are not associated with speech. That is, Waters et al. do not address providing other gestures, such as those associated with facial or other body movements, which by themselves are often a means of expression or communication.

Some attempts have been made to provide animated facial and other body gestures. For example, animated facial gestures made up of individual facial components have been provided in accordance with the teachings of Parke, F. and Waters, K., in *Computer Facial Animation,* A K Peters, Ltd. (1996), which is hereby incorporated herein by reference. However, controlling the animation of such animated facial gestures is cumbersome since each individual facial component has to be individually controlled at every instance in time.

In view of the foregoing, it is apparent that previously proposed techniques for providing a computer generated synthetic face do not provide certain features which would make the computer generated synthetic face more realistic. Also, the previously proposed techniques do not allow a computer generated synthetic face to be easily controlled. Accordingly, it would be desirable to provide a technique for providing a more realistic and easily controllable computer generated synthetic face.

OBJECTS OF THE INVENTION

The primary object of the present invention is to provide a technique for controlling a presentation of a computer generated object having a plurality of movable components.

The above-stated primary object, as well as other objects, features, and advantages, of the present invention will become readily apparent from the following detailed description which is to be read in conjunction with the appended drawings.

SUMMARY OF THE INVENTION

According to the present invention, a technique for controlling a presentation of a computer generated object having a plurality of movable components is provided. The technique can be realized by having a processing device such as, for example, a digital computer, receive a gesture element and an audio element. The gesture element represents a gesture (e.g., a smile, a frown, raising eyebrows, a wink, etc.) involving one or more of the plurality of movable components. The audio element represents an audio signal (e.g., speech, a whistle, humming, etc.). The gesture element and the audio element are received by the processing device in a sequential order.

The processing device processes the gesture element and the audio element in the sequential order so that each of the plurality of movable components associated with the gesture element are moved to perform the gesture and the audio signal associated with the audio element is generated during a presentation of the computer generated object. The presentation of the computer generated object can be performed on a monitor such as, for example, a cathode ray tube (CRT).

In accordance with aspects of the invention, the processing device can process the gesture element and the audio element such that the gesture is performed and the audio signal is generated simultaneously.

The computer generated object can be, for example, a computer generated face. In such a case, the plurality of movable components may be facial muscles, the gesture might be a facial expression, and the audio signal might be a speech which includes a particular message.

Beneficially, the gesture element has an associated modifier. The associated modifier can correspond, for example, to a performance rate, such as the speed at which the gesture is performed, or to a performance extent, such as the magnitude at which the gesture is performed. The gesture element can be defined to have a temporal duration. That is, the gesture element can be processed by the processing device such that the gesture is performed over a specified period of time.

In accordance with other aspects of the invention, the gesture element can be defined using at least one gesture component such as, for example, a face muscle or an eyelid. Each gesture component has an associated modifier which corresponds, for example, to a performance extent of the gesture component.

If desired, the gesture element and the audio element can be stored in a memory. The stored gesture element and the audio element can then be retrieved from the memory by the processing device.

In accordance with a further aspect of the present invention, a text file can be created containing the gesture element and the audio element. The processing device can then receive the gesture element and the audio element by reading the gesture element and the audio element from the text file.

In accordance with a still further aspect of the present invention, the processing device also receives a configuration element. The configuration element represents a characteristic of the computer generated object such as, for example, a face type, a voice type, or a speech rate. The configuration element is sequentially received by the processing device along with the other elements. The processing device processes the configuration element in turn so that the characteristic of the computer generated object is generated during the presentation of the computer generated object.

In accordance with a still further aspect of the present invention, the gesture element is typically one of a plurality of previously defined gesture elements. The gesture element can then be defined using one or more of the plurality of previously defined gesture elements.

In accordance with a still further aspect of the present invention, the processing device processes the gesture element such that an additional movement is superimposed upon the movement of at least one of the plurality of movable components associated with the gesture element.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

Figure 1:
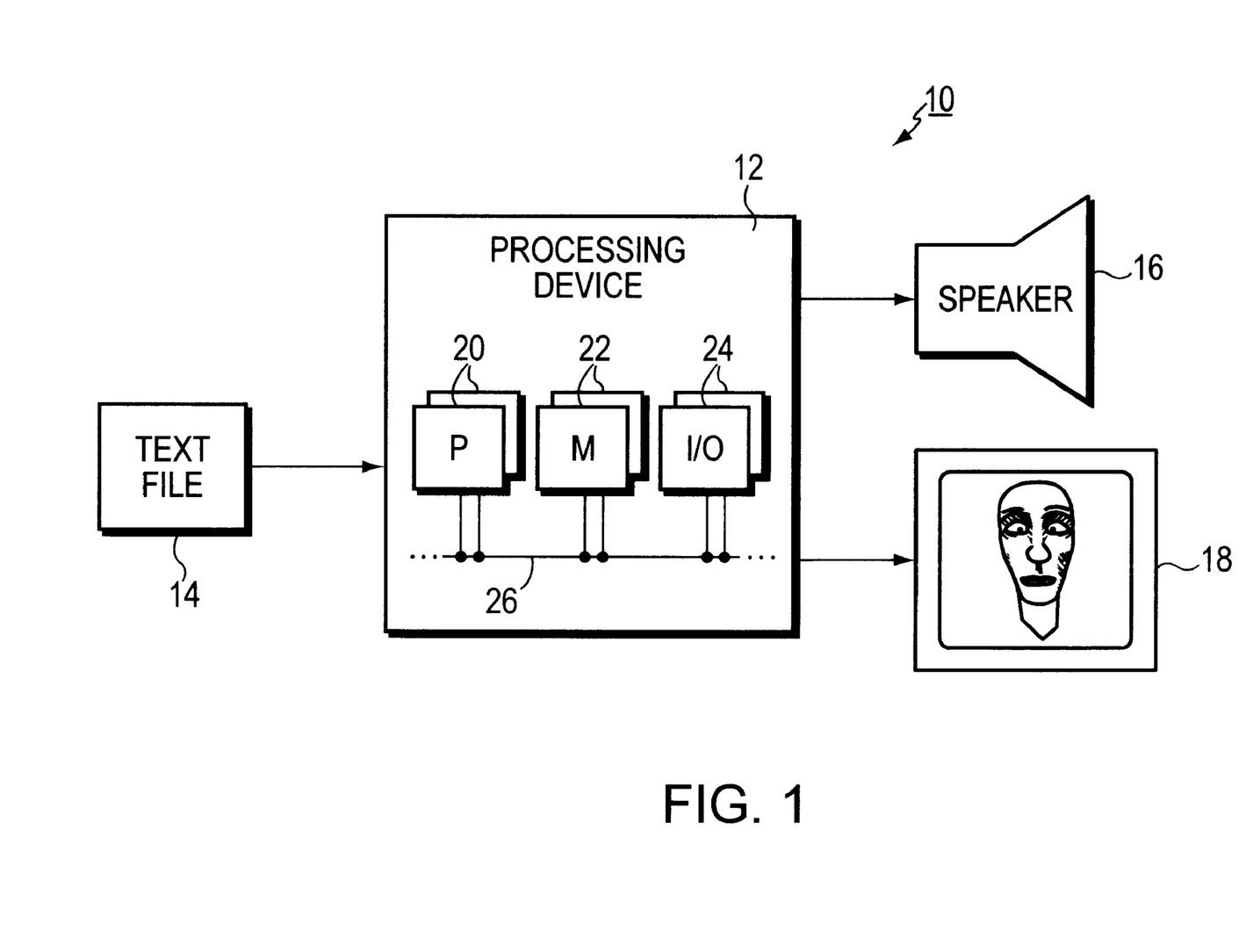
FIG. 1 is a schematic diagram of a processing system in accordance with the present invention.

Referring to FIG. 1, there is shown a schematic diagram of a processing system 10 comprising a processing device 12 an input text file 14, a speaker 16, and a monitor 18. The processing device 12 receives text elements from the input text file 14. The processing device 12 transmits output data to the speaker 16 for controlling an audible signal, and to the monitor 18 for controlling a visual display.

The processing device 12 is preferably a digital computer that allows for multitasking. In an alternative embodiment, the processing device 12 may be configured as several digital computers, which may communicate through one or more network connections.

The processing device 12 processes the text elements that are received from the input text file 14, and generates the output data that is transmitted to the speaker 16 and the monitor 18. The processing of the text elements and the generation of the output data are preferably implemented by software programs in the processing device 12. Thus, the processing device 12 preferably comprises at least one processor (P) 20, memory (M) 22, and input/output (I/O) interface 24, that are connected to each other by a bus 26, for implementing the processing of the text elements and the generation of the output data. That is, the processing device 12 preferably receives the text elements from the input text file 14 via the I/O interface 24, processes the text elements and generates the output data via the processor 20 and the memory 22, and transmits the output data to the speaker 16 and the monitor 18 via the I/O interface 24.

It should be noted that the input text file 14 could alternatively be stored in the memory 22 of the processing device 12. The processing device 12 could then process the text elements by having the processor 20 access the input text file 14 in the memory 22 of the processing device 12.

Figure 2:
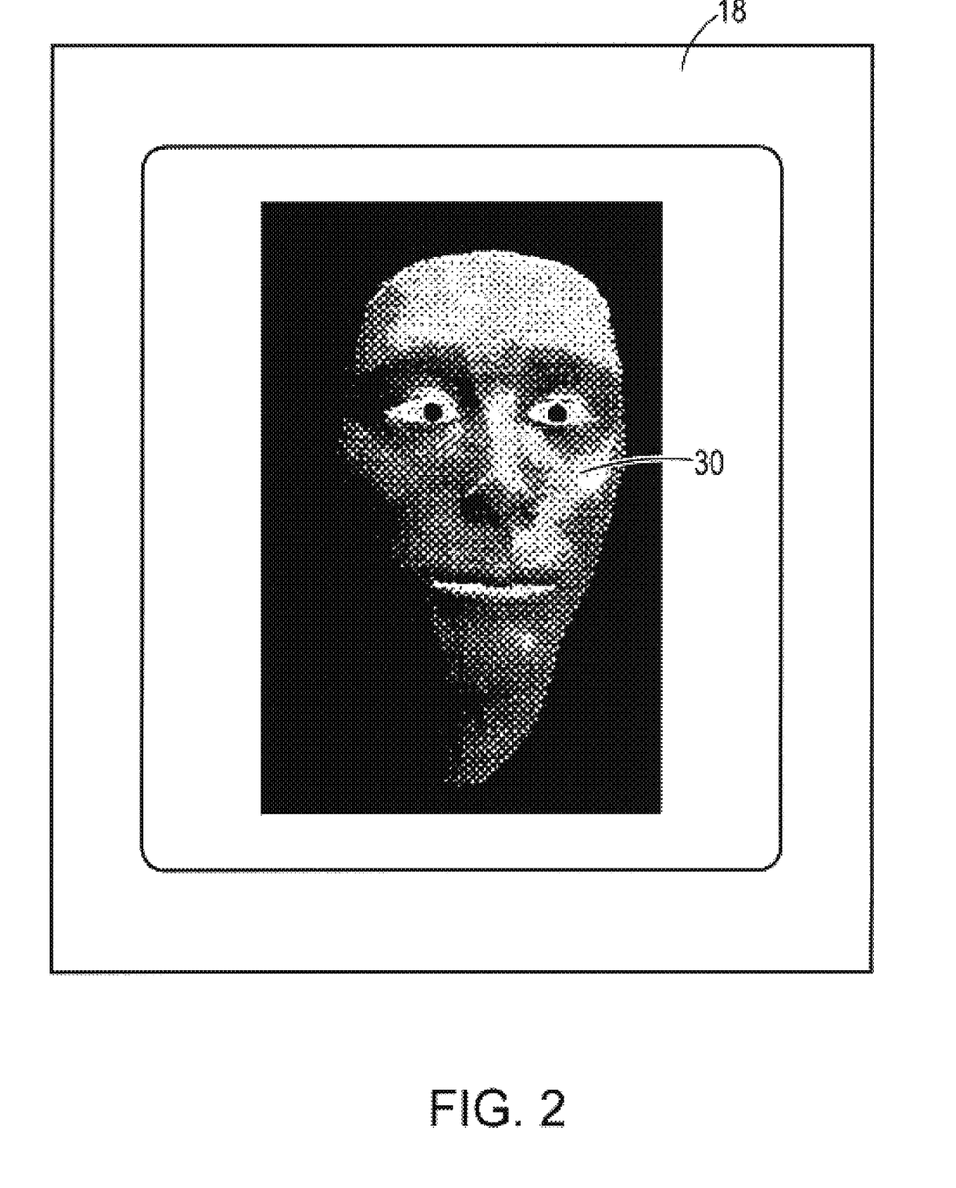
FIG. 2 shows a display of a computer generated synthetic face on a monitor in accordance with the present invention.

As previously mentioned, the output data to the monitor 18 controls a visual display. The visual display can take many forms, one of which being a computer generated synthetic face 30 as shown in FIG. 2. As shown, the computer generated synthetic face 30 may comprise all of the features of a human face such as, for example, a forehead, cheeks, mouth, nose, etc. For such a computer generated synthetic face 30 to be realistic, it must communicate in a humanistic manner. This generally means that the computer generated synthetic face 30 must perform facial gestures while communicating in either a verbal or nonverbal manner.

Figure 3:
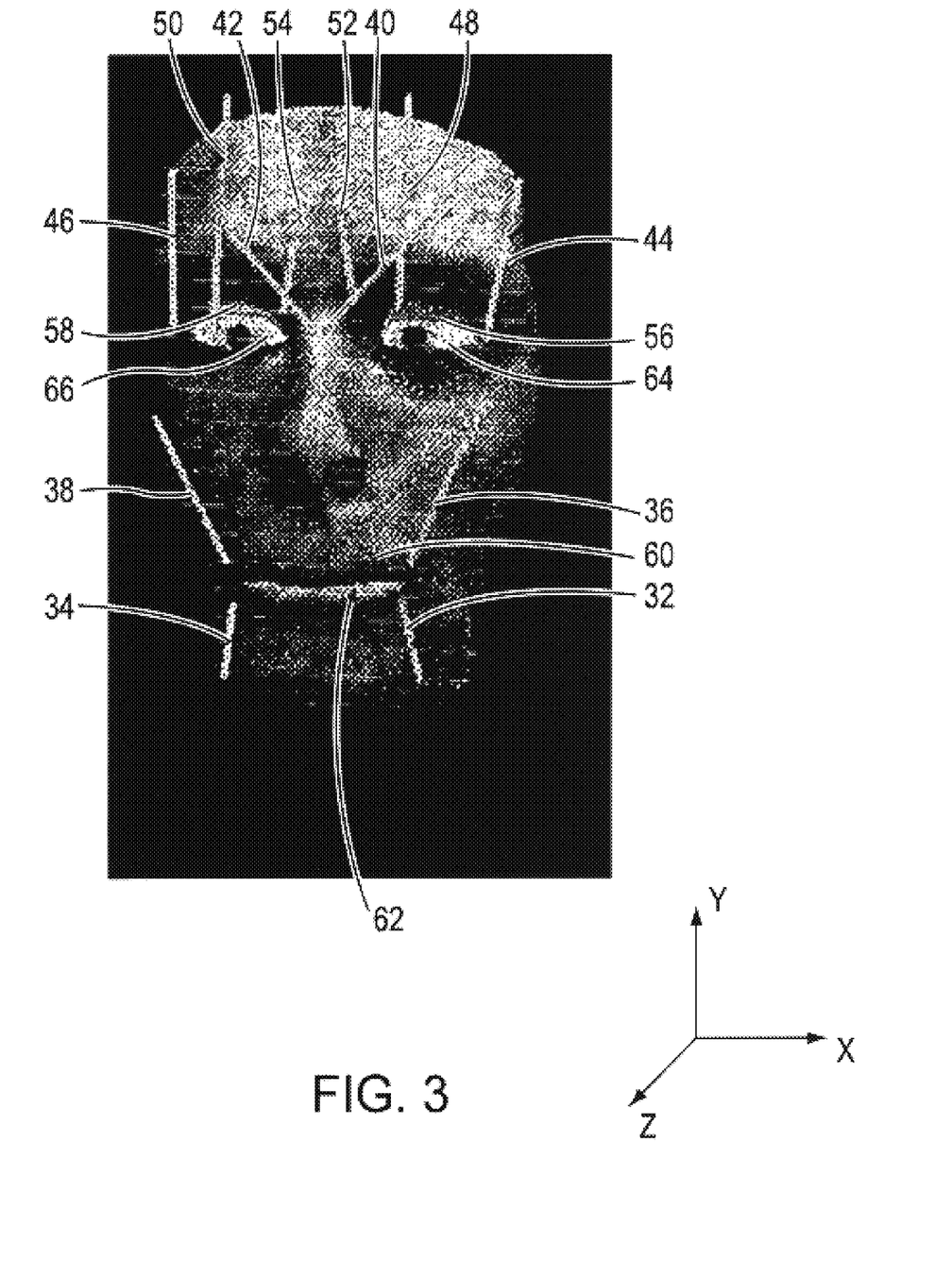
FIG. 3 shows a detailed representation of a computer generated synthetic face in accordance with the present invention.

Referring to FIG. 3, there is shown a detailed representation of the computer generated synthetic face 30. The computer generated synthetic face 30 has superimposed thereon a lower right cheek muscle (right_muscle_2) indication line 32, a lower left cheek muscle (left_muscle_2) indication line 34, an upper right cheek muscle (right_muscle_1) indication line 36, an upper left cheek muscle (left_muscle_1) indication line 38, an upper right nose muscle (right_muscle_6) indication line 40, an upper left nose muscle (left_muscle_6) indication line 42, an outer right eyebrow muscle (right_muscle_5) indication line 44, an outer left eyebrow muscle (left_muscle_5) indication line 46, an inner right eyebrow muscle (right_muscle_4) indication line 48, an inner left eyebrow muscle (left_muscle_4) indication line 50, a right forehead muscle (right_muscle_3) indication line 52, and a left forehead muscle (left_muscle_3) indication line 54. All of the above-identified indication lines indicate muscles of the computer generated synthetic face 30 that are individually controllable by the processing device 12. That is, the processing device 12 can individually control the movement of each of the above-identified facial muscles of the computer generated synthetic face 30, as will be described in more detail below. It should be noted, however, that each of the above-identified facial muscles of the computer generated synthetic face 30 will default to a respective "relaxed" position when not being individually controlled by the processing device 12.

The processing device 12 can also individually control a right eyelid (right_eyelid) 56 and a left eyelid (left_eyelid) 58 of the computer generated synthetic face 30. That is, the processing device 12 can individually control the opening and the closing of each of the above-identified eyelids of the computer generated synthetic face 30, as will be described in more detail below. It should be noted, however, that each of the above-identified eyelids of the computer generated synthetic face 30 will default to an "open" position when not being individually controlled by the processing device 12.

It should be noted that an upper lip 60 and a lower lip 62 of the computer generated synthetic face 30, as well as the teeth (see FIG. 6) of the computer generated synthetic face 30, can be controlled by the processing device 12 to produce visemes in accordance with the technique that is described in U.S. Pat. No. 5,657,426, which was previously incorporated herein by reference. It should be noted, however, that the upper lip 60 and the lower lip 62 of the computer generated synthetic face 30 will default to a "closed mouth" position when not being controlled by the processing device 12.

The processing device 12 can further individually control the gaze direction of a right eye 64 and a left eye 66 of the computer generated synthetic face 30. That is, the processing device 12 can individually control the rotation of the gaze direction of the right eye 64 and the left eye 66 of the computer generated synthetic face 30 around corresponding X and Y axes (eye_x, eye_y) (i.e., two degrees of freedom) in the visual display, as will be described in more detail below. It should be noted that the rotation of the gaze direction of the right eye 64 and the left eye 66 of the computer generated synthetic face 30 around corresponding X and Y axes is measured relative to the overall direction of the entire computer generated synthetic face 30. It should also be noted that the gaze direction of the right eye 64 and the left eye 66 of the computer generated synthetic face 30 will default to a "straight ahead" direction when not being individually controlled by the processing device 12. The processing device 12 can still further individually control the convergence of the right eye 64 and the left eye 66 of the computer generated synthetic face 30 (i.e., the point at which both the right eye 64 and the left eye 66 are directed). That is, the processing device 12 can individually control the focal distance (eye_distance) of the right eye 64 and the left eye 66 of the computer generated synthetic face 30 in the visual display, as will be described in more detail below. It should be noted, however, that the convergence of the right eye 64 and the left eye 66 of the computer generated synthetic face 30 will default to infinity (i.e., the right eye 64 and the left eye 66 will both be directed straight ahead) when not being individually controlled by the processing device 12.

The processing device 12 can still further individually control the entire computer generated synthetic face 30. That is, the processing device 12 can individually control the rotation of the entire computer generated synthetic face 30 around corresponding X, Y, and Z axes (rotate_x, rotate_y, rotate_z) (i.e., three degrees of freedom), the translation of the entire computer generated synthetic face 30 along corresponding X and Y axes (translate_x, translate_y) (i.e., two degrees of freedom), and the overall scale (scale) of the entire computer generated synthetic face 30 in the visual display, as will be described in more detail below. It should be noted, however, that the rotation and the translation of the entire computer generated synthetic face 30 will default to a "upright, straight ahead, and centered" position when not being individually controlled by the processing device 12. It should also be noted that the overall scale of the entire computer generated synthetic face 30 will default to a predefined scale when not being individually controlled by the processing device 12.

At this point it should be noted that some of the above-identified facial components have previously been defined by Parke, F. and Waters, K., in *Computer Facial Animation*, A K Peters, Ltd. (1996), which was previously incorporated herein by reference.

The processing device 12 controls all of the above-identified facial components by processing the individual text elements that are received from the input text file 14. The individual text elements comprise configuration elements, gesture elements, and audio elements. Each configuration element is made up of a textual configuration and possibly one or more corresponding textual configuration modifiers that are recognized by the processing device 12. Each gesture element is made up of a textual gesture and possibly one or more corresponding textual gesture modifiers that are recognized by the processing device 12. Each audio element, which is typically associated with audio speech, is made up of a textual word or phrase that can be processed by the processing device 12 to produce audio signals and visemes in accordance with the technique that is described in U.S. Pat. No. 5,657,426, which was previously incorporated herein by reference.

Referring to Table 1, example configuration elements of "face", "voice", "speech", and "clear" are listed. The face configuration element includes a "face" configuration and a corresponding configuration "type" modifier. The processing device 12 processes the face configuration element so as to control the face type that is displayed on the monitor 18. That is, the "face" configuration is processed by the processing device 12 as a command to change the face type that is displayed on the monitor 18. The configuration "type" modifier corresponds to different face types that can be displayed on the monitor 18. For example, referring to FIG. 4, there is shown a gallery 70 of different face types that can be displayed on the monitor 18. The different face types comprise the computer generated synthetic face 30 shown in FIGS. 2 and 3, a woman face 72, a man face 74, a rodent face 76, a dog face 78, and a gorilla face 80. Of course, other face types are also possible.

TABLE 1

Figure 4:
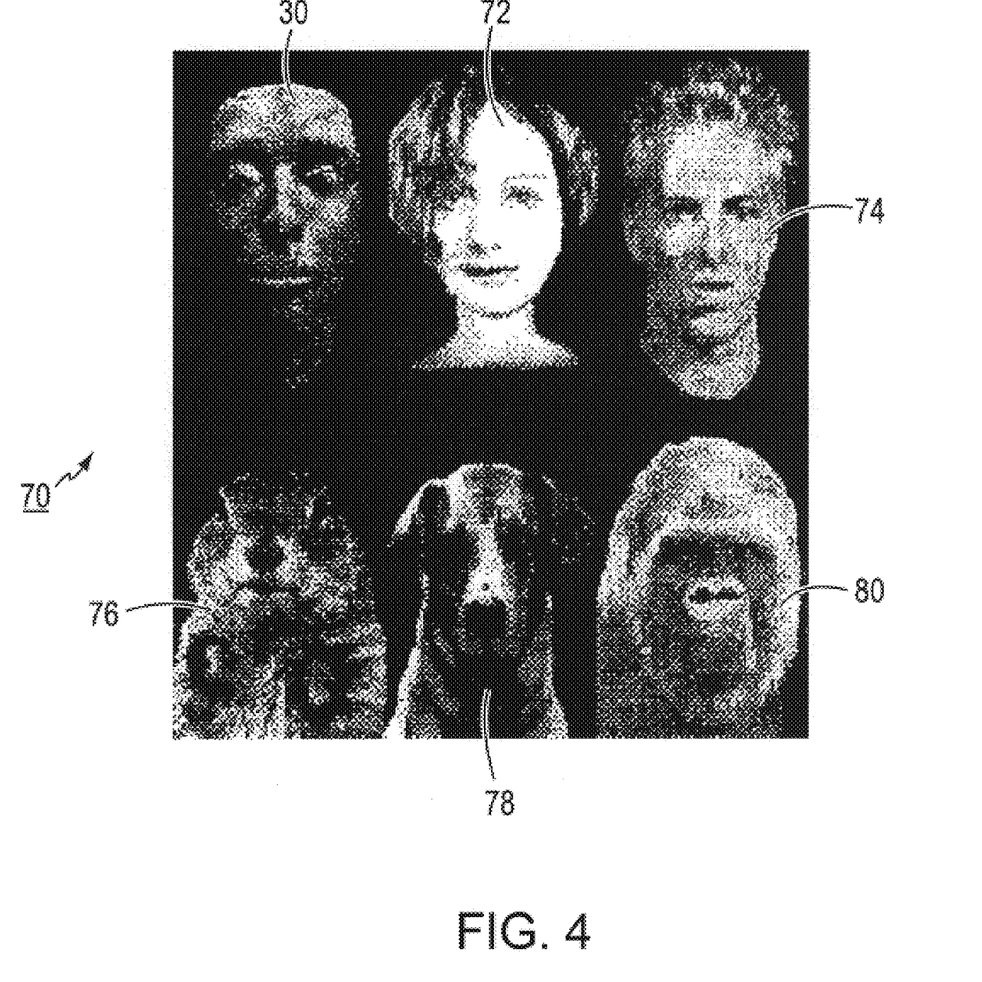
FIG. 4 shows a gallery of different face types that can be displayed on a monitor in accordance with the present invention.

<face type> - specifies the displayed face type.
<voice type> - specifies the audibilized voice type.
<speech [very-quickly, quickly, normally, slowly, very-slowly, rate = NUMBER]> - speech rate.
<clear> - clears all facial components to default values.

The voice configuration element includes a "voice" configuration and a corresponding configuration "type" modifier. The processing device 12 processes the voice configuration element so as to control the voice type that is audibilized by the speaker 16. That is, the "voice" configuration is processed by the processing device 12 as a command to change the voice type that is audibilized by the speaker 16. The configuration "type" modifier corresponds to different voice types that can be audibilized by the speaker 16. Several voice types are possible. For example, a man's voice, a woman's voice, or a child's voice can be audibilized by the speaker 16.

The speech configuration element includes a "speech" configuration and corresponding configuration rate modifiers. The processing device 12 processes the speech configuration element so as to control the speech rate that is audibilized by the speaker 16. That is, the "speech" configuration is processed by the processing device 12 as a command to change the speech rate that is audibilized by the speaker 16. The configuration rate modifiers correspond to different speech rates that can be audibilized by the speaker 16. The speech rate can be set using one of the rate terms (i.e., very-quickly, quickly, normally, slowly, very-slowly), or using the rate number (i.e., rate=NUMBER). For example, the rate term "quickly" sets the speech rate to about 240 words per minute. A rate number of 240 (i.e., rate=240) does exactly the same thing. The normal speech rate is 180 words per minute.

The clear configuration element includes a "clear" configuration. The processing device 12 processes the clear configuration element so as to clear all of the above-identified facial components to their default values. That is, the "clear" configuration is processed by the processing device 12 as a command to clear all of the above-identified facial components to their default values.

Referring to Table 2, the syntax for all gesture elements is listed. As previously indicated, each gesture element is made up of a textual gesture and possibly one or more corresponding textual gesture modifiers. Each textual gesture corresponds to a gesture that is displayed on the monitor 18, as will be described in more detail below. The textual gesture modifiers include "rate-type", "extent", and "pause" gesture modifiers. Each textual gesture modifier corresponds to a different performance characteristic of an associated gesture.

TABLE 2

<gesture [rate-type, extent = PERCENTAGE, pause]>,
  wherein rate-type: = very-slowly, slowly, normally,
  quickly, very-quickly, or rate = %

The processing device 12 processes each gesture element so as to control the display of a corresponding gesture on the monitor 18. That is, each gesture element is processed by the processing device 12 as a command to control the manner in which a corresponding gesture is displayed on the monitor 18.

The "rate-type" gesture modifier corresponds to the performance rate of an associated gesture. The performance rate can be set using one of the "rate-type" terms (i.e., very-slowly, slowly, normally, quickly, very-quickly), or using the "rate-type" percentage rate (i.e., rate=PERCENTAGE). For example, the term "very-slowly" sets the performance rate to 25% of a predefined normal rate. A percentage rate equal to 25% (i.e., rate=25%) does exactly the same thing.

The "extent" gesture modifier corresponds to the performance extent of an associated gesture. For example, an extent setting of 50% (i.e., extent=50%) will cause a corresponding gesture to be performed at 50% of a predefined default performance level. It should be noted that the percentage range can be less than 0% and greater than 100%.

The "pause" gesture modifier is used to suspend any speech until the performance of a corresponding gesture has been completed. That is, the use of the "pause" gesture modifier will cause the processing device 12 to suspend processing of an audio element until the performance of a corresponding gesture has been completed.

Each textual gesture can be either a simple textual gesture or a complex textual gesture. Simple textual gestures are used to express a single gesture, while complex textual gestures are used to express a sequence of gestures. Simple textual gestures are defined by one or more of the above-identified facial components, each having an associated modifier. The above-identified facial components, along with their associated modifiers, are summarized below in Table 3.

TABLE 3 left_muscle_ [= EXTENT in percentage of predefined
default muscle deflection]
right_muscle_1 [= EXTENT in percentage of predefined
default muscle deflection]
right_muscle_6 [= EXTENT in percentage of predefined
defalt muscle deflection]
rotate_x [= EXTENT in degrees of face rotation about x-axis]
rotate_y [= EXTENT in degrees of face rotation about y-axis]
rotate_z [= EXTENT in degrees of face rotation about z-axis]
translate_x [= EXTENT in percentage of face distance along x-axis
(0 to +/−100%)]
translate_y [= EXTENT in percentage of face distance along y-axis
(0 to +/−100%)]
scale [= EXTENT in percentage of face size (100% nominal)]
left_eyelid [= EXTENT in percentage of eyelid closed]
right_eyelid [= EXTENT in percentage of eyelid closed]
eye_x [= EXTENT in degrees of eye rotation about x-axis
relative to overall direction of face]
eye_y [= EXTENT in degrees of eye rotation about y-axis
relative to overall direction of face]
eye_distance [= EXTENT in inches to focal point]
viseme [= 0–76 value of non-speaking mouth posture]

Referring to Table 4, the simple textual gestures "smile", "frown", "eyebrows-up", and "disgust" are defined in terms of the above-listed facial components. The smile textual gesture is defined by having the upper left cheek muscle (left_muscle_1) 38 and the upper right cheek muscle (right_muscle_1) 36 deflect to 100% of a predefined default muscle deflection. That is, the upper left cheek muscle (left_muscle_1) 38 and the upper right cheek muscle (right_muscle_1) 36 are deflected vertically upward so that the computer generated synthetic face 30 will display a smile. In contrast, the frown textual gesture is defined by having the lower left cheek muscle (left_muscle_2) 34 and the lower right cheek muscle (right_muscle_2) 32 deflect to 100% of a predefined default muscle deflection. That is, the lower left cheek muscle (left_muscle_2) 34 and the lower right cheek muscle (right_muscle_2) 32 are deflected vertically downward so that the computer generated synthetic face 30 will display a frown.

TABLE 4 smile:
    left_muscle_1 = 100%
    right_muscle_1 = 100%;
frown:
    left_muscle_2 = 100%
    right_muscle_2 = 100%;
eyebrows-up:
    left_muscle_4 = 100%
    right_muscle_4 = 100%;
disgust:
    left_muscle_1 = 100%
    right_muscle_1 = 20%
    left_muscle_2 = 100%
    right_muscle_2 = 20%
    left_eyelid = 40%
    right_eyelid = 40%
    eye_x = 5;

The eyebrows-up textual gesture is defined by having the inner left eyebrow muscle (left_muscle_4) 50 and the inner right eyebrow muscle (right_muscle_4) 48 deflect to 100% of an overall maximum deflection. That is, the inner left eyebrow muscle (left_muscle_4) 50 and the inner right eyebrow muscle (right_muscle_4) 48 are deflected vertically upward so that the computer generated synthetic face 30 will display raised eyebrows.

Figure 5:
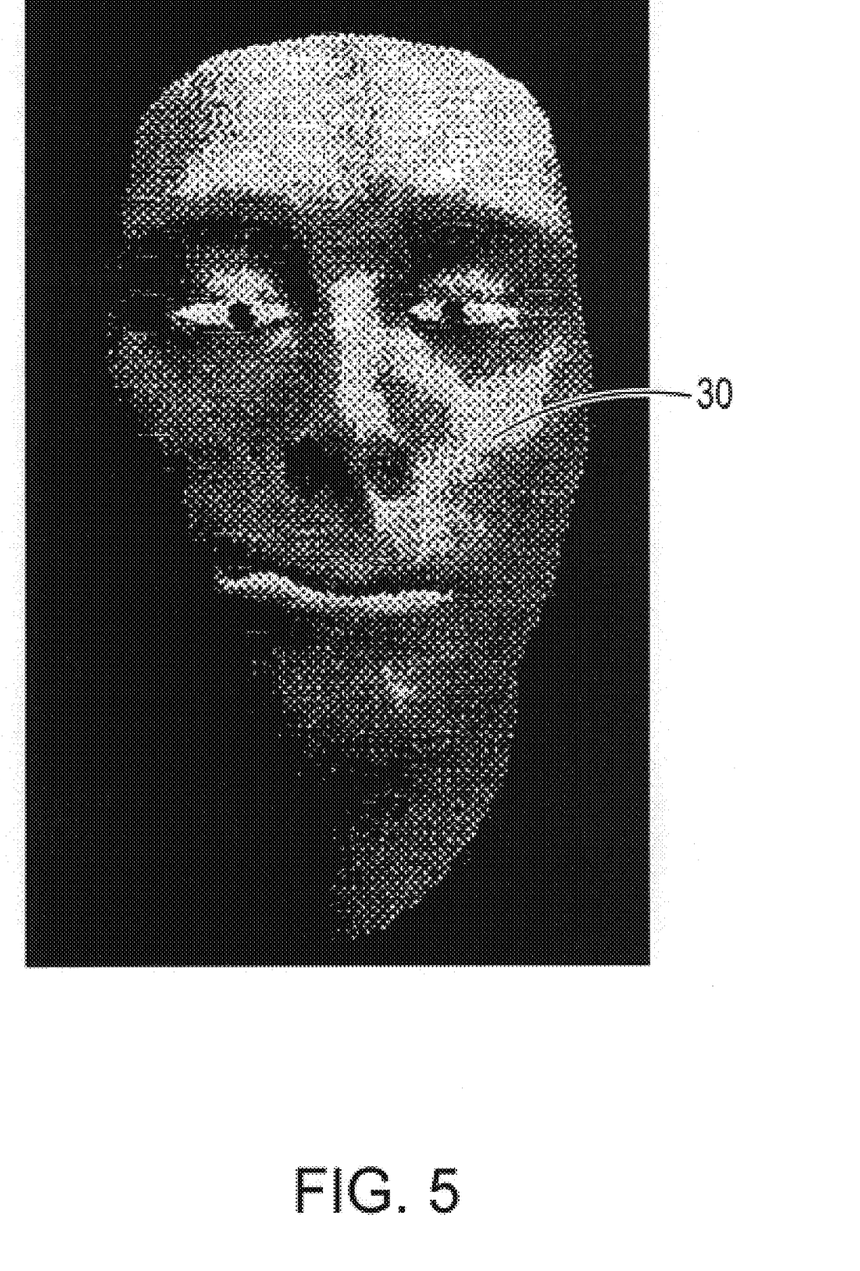
FIG. 5 shows a computer generated synthetic face displaying a look of disgust in accordance with the present invention.

The disgust textual gesture is defined by having the upper left cheek muscle (left_muscle_1) 38 and the lower left cheek muscle (left_muscle_2) 34 deflect to 100% of a predefined default muscle deflection, the upper right cheek muscle (right_muscle_1) 36 and the lower right cheek muscle (right_muscle_2) 32 deflect to 20% of a predefined default muscle deflection, the left eyelid (left_eyelid) 58 and the right eyelid (right_eyelid) 56 close 40%, and the eyes (eye_x) rotate 5 degrees about the x-axis relative to the overall direction of the computer generated synthetic face 30. Referring to FIG. 5, the computer generated synthetic face 30 is shown displaying a look of disgust which occurs when a gesture element including a disgust textual gesture is processed by the processing device 12.

At this point it should be noted that the processing device 12 processes each simple textual gesture such that all of the above-identified facial components that are defined in a simple textual gesture are displayed at the same time. That is, unlike complex textual gestures, simple textual gestures have no associated duration modifiers.

Complex textual gestures can be defined by one or more of the above-identified facial components, each having an associated modifier, and at least one duration modifier. Complex textual gestures can also be defined by one or more simple textual gestures, and at least one duration modifier. Complex textual gestures can further be defined by one or more other complex textual gestures. Additionally, complex textual gestures can be defined by a combination of any of the above. For example, the complex textual gestures "wink", "smile-briefly", "raise-eyebrows", and "just-kidding" are defined in Table 5. Each duration modifier is measured in milliseconds.

TABLE 5

```
wink:
    left_eyelid = 100%,
    duration = 500,
    left_eyelid = 0%;
smile-briefly:
    smile duration = 500,
    ~smile duration = 500;
raise-eyebrows:
    eyebrows-up duration = 250,
    duration = 500,
    ~eyebrows-up duration = 250;
just-kidding:
    wink,
    smile-briefly;
```

Each independent facial component, simple textual gesture, duration modifier, or complex textual gesture employed in a complex textual gesture is separated by a comma. For example, the wink textual gesture is defined by having the left eyelid (left_eyelid) 58 close 100% (i.e., close all the way), waiting for a duration of 500 milliseconds, and then having the left eyelid (left_eyelid) 58 close 0% (i.e., open all the way). The left eyelid facial components (left_eyelid) and the duration modifier are separated by commas because each are independent of one another.

The smile-briefly textual gesture is defined by performing the smile textual gesture (defined in Table 4 above) over a period of 500 milliseconds, and then performing the inverse of the smile textual gesture over a period of 500 milliseconds. Since the duration modifier was directly associated with both of the smile textual gestures, no comma is placed between each smile textual gestures and its associated duration modifier. However, a comma is located between the first pairing of the smile textual gesture and its associated duration modifier and the second pairing of the smile textual gesture and its associated duration modifier because the first and second pairings are independent of one another.

The raise-eyebrows textual gesture is defined by performing the eyebrows-up textual gesture (defined in Table 4 above) over a period of 250 milliseconds, waiting for a duration of 500 milliseconds, and then performing the inverse of the eyebrows-up textual gesture over a period of 250 milliseconds. Since a duration modifier was directly associated with each of the eyebrows-up textual gestures, no comma is placed between each eyebrows-up textual gestures and its associated duration modifier. However, a comma is located between the first pairing of the eyebrows-up textual gesture and its associated duration modifier (i.e., eyebrows-up duration=250), the stand-alone duration modifier (i.e., duration=500), and the second pairing of the eyebrows-up textual gesture and its associated duration modifier (i.e., eyebrows-up duration=250) because the first and second pairings and the stand-alone duration modifier are all independent of one another.

The just-kidding textual gesture is defined by performing the wink textual gesture and then performing the smile-briefly textual gesture. The wink textual gesture and the smile-briefly textual gesture are separated by commas because they are independent of one another.

At this point it should be noted that the "~" character is used to define the inverse of a textual gesture. That is, whenever a textual gesture has been defined, an inverse of that textual gesture is also defined by placing the "~" character immediately preceding the textual gesture. For example, as previously indicated, the smile-briefly textual gesture is defined by performing the smile textual gesture over a period of 500 milliseconds, and then performing the inverse of the smile textual gesture over a period of 500 milliseconds. The inverse of the smile textual gesture is defined by placing the "~" character immediately preceding the smile textual gesture.

At this point it should be noted that the right eye 64 and the left eye 66 of the computer generated synthetic face 30 can alternatively be controlled according to presentation techniques such as have been described in U.S. patent application Ser. No. 09/020,038, entitled Technique for Acknowledging Multiple Objects Using a Computer Generated Face, and in U.S. patent application Ser. No. 09/020,036, entitled Technique for Providing a Computer Generated Face Having Coordinated Eye and Head Movement, filed by Christian et al. on Feb. 6, 1998, and which are hereby incorporated herein by reference. The presentation techniques disclosed therein allow the eyes of a computer generated face to be moved independently of the rest of the computer generated face so as to track or otherwise acknowledge the presence of objects. These presentation techniques can be incorporated into the present invention to provide a realistic computer generated face in accordance with the present invention.

The above-referenced presentation techniques can be incorporated into the present invention in an additive, or superimposed, manner. That is, the processing device 12 can superimpose eye movements or positions derived from the above-referenced presentation techniques on top of eye movements or positions derived from the control techniques that were previously described herein. For example, the processing device 12 can initially control the movement or position of the right eye 64 and the left eye 66 of the computer generated synthetic face 30 using the control techniques that were previously described herein, and then further control the movement or position of the right eye 64 and the left eye 66 of the computer generated synthetic face 30 using the above-referenced presentation techniques.

The processing device 12 switches between using the above-referenced presentation techniques and not using the above-referenced presentation techniques by a tracking control parameter that can be incorporated into a simple or complex textual gesture. Referring to Table 6, the syntax for the tracking control parameter is listed.

TABLE 6 no_track [= 0 for tracking mode, 1 for non-tracking mode]

The tracking control parameter can be used to have the computer generated synthetic face 30 "look" at an object being displayed on the monitor 18. For example, the complex textual gesture "look-at-screen", which allows for such a use, is defined in Table 7.

TABLE 7

```
look-at-screen:
    no_track = 1 rotate_y = 30 rotate_x = 30,
    duration = 1000,
    no_track = 0 rotate_y = 0 rotate_x =0;
```

All of the simple and complex textual gestures that have been defined are stored in one or more gesture files in, for example, the memory 22. The processing device 12 accesses each gesture file as needed when processing the text elements that are received from the input text file 14.

Figure 6:
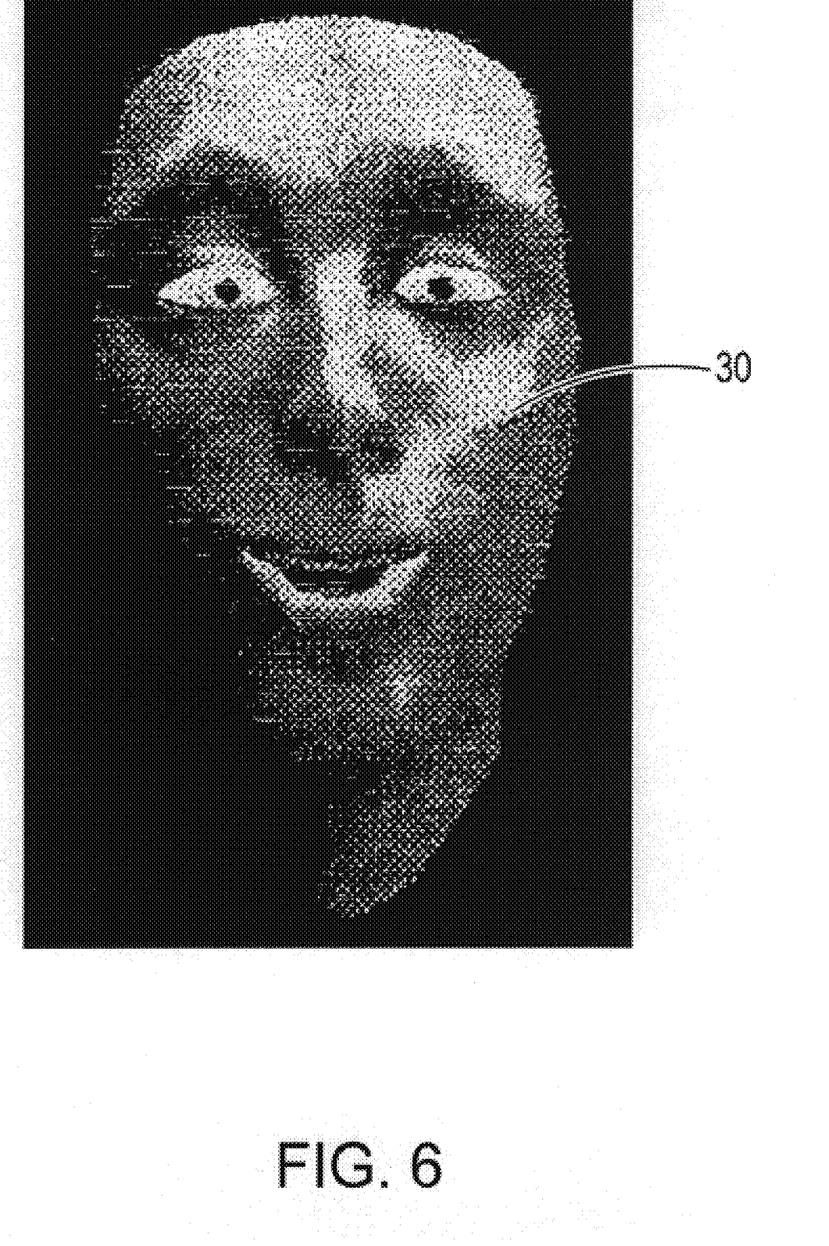
FIG. 6 shows a single frame that is displayed on a monitor during a period in which a computer generated synthetic face is smiling and raising eyebrows while speaking in accordance with the present invention.

Referring to Table 8, a sample of an input text file 14 is listed. The processing device 12 processes this input text file 14 by first causing all facial components on a prior face type to be cleared to their default values (i.e., by <clear>). The processing device 12 then causes the computer generated synthetic face 30 to be displayed on the monitor 18 (i.e., by <face synthetic>), causes the voice type to be set to a man's voice (i.e., by <voice man>), and causes the speech rate to be set to quickly (i.e., by <speech quickly>). The processing device 12 then causes a smile to appear on the computer generated synthetic face 30 (i.e., by <smile>). The processing device 12 then causes the eyebrows of the computer generated synthetic face 30 to be raised up to 75% of their predefined default muscle deflection over the course of 500 milliseconds, held there for 1000 milliseconds, and then lowered over the course of 500 milliseconds (i.e., by <raise-eyebrows slowly extent=75>). During this time, the processing device 12 causes the phrase "Wow! Nice shoes" to be audibilized at the speaker 16, and also causes corresponding visemes to be displayed on the computer generated synthetic face 30. A single frame that is displayed on the monitor 18 during this period is shown in FIG. 6. Note that the computer generated synthetic face 30 is smiling and raising eyebrows while "speaking".

TABLE 8

```
<clear>
<face synthetic> <voice man> <speech quickly>
<smile> <raise-eyebrows slowly extent = 75>
Wow! Nice shoes.
<~smile> <disgust> <speech slowly>
But what's with the white socks?
<~disgust>
```

Next, the processing device 12 causes the smile to be removed from the computer generated synthetic face 30 (i.e., by <~smile>), and a look of disgust (see FIG. 5) to appear on the computer generated synthetic face 30 (i.e., by <disgust>). The processing device 12 then causes the speech rate to be set to slowly (i.e., by <speech slowly>). The processing device 12 then causes the phrase "But what's with the white socks?" to be audibilized at the speaker 16, and also causes corresponding visemes to be displayed on the computer generated synthetic face 30. The processing device 12 then causes the look of disgust to be removed from the computer generated synthetic face 30 (i.e, by <~disgust>).

At this point it should be noted that although the computer generated synthetic face 30 has been shown herein as having human characteristics, it is within the scope of the present invention to provide a computer generated face having other than human characteristics. That is, a computer generated face having human, subhuman, real, imaginary, or any number of a variety of characteristics can be provided in accordance with the present invention. For example, any of the computer generated faces shown in the gallery 70 of different face types shown in FIG. 4 may be used in the manner described above to provide a realistic computer generated face in accordance with the present invention. It should also be noted that the mapping of such computer generated faces as shown in FIG. 4 can be performed in accordance with the teachings of Kang et al. as described in U.S. patent application Ser. No. 08/815,981, entitled Facial Image Method and Apparatus for Semi-Automatically Mapping a Face onto a Wireframe Topology, filed Mar. 10, 1997, assigned to the assignee of the present application, and hereby incorporated herein by reference.

It should further be noted that other gestures, besides facial gestures, can be controlled in accordance with the present invention. That is, other movable components such as, for example, arms and legs, can be controlled by processing corresponding text elements received from the input text file 14 in accordance with the present invention.

The present invention is not to be limited in scope by the specific embodiments described herein. Indeed, various modifications of the present invention, in addition to those described herein, will be apparent to those of skill in the art from the foregoing description and accompanying drawings. Thus, such modifications are intended to fall within the scope of the appended claims.

What is claimed is:

1. A method for controlling a presentation of a computer generated object having a plurality of movable components, the method comprising the steps of:

receiving a gesture element, an associated modifier and an audio element at a processing device, the gesture element representing a gesture involving one or more of the plurality of movable components, the audio element representing an audio signal, the gesture element and the audio element being received in a sequential order, and wherein the associated modifier controls a performance rate of the gesture element or the audio signal, and wherein the sequential order of receipt of the gesture element and the associated modifier and the audio signal determines the timing of the presentation of the gesture element with respect to the audio element including inclusion of the associated modifier; and processing the gesture element and the audio element in the sequential order so that each of the plurality of movable components associated with the gesture element are moved to perform the gesture and the audio signal associated with the audio element is generated in accordance with the timing indicated by the sequence order and the associated modifier during a presentation of the computer generated object.

2. The method as defined in claim 1, further comprising the step of indicating when the sequential order is to be disregarded so that the gesture and the audio signal are performed simultaneously.

3. The method as defined in claim 1, wherein the computer generated object is a computer generated face.

4. The method as defined in claim 3, wherein the plurality of movable components include facial muscles.

5. The method as defined in claim 3, wherein the plurality of movable components include eyes.

6. The method as defined in claim 3, wherein the plurality of movable components include a head upon which the computer generated face is formed.

7. The method as defined in claim 3, wherein the gesture is a facial expression.

8. The method as defined in claim 1, wherein the audio signal is a speech signal.

9. The method as defined in claim 1, of wherein the associated modifier corresponds to a performance extent of the gesture.

10. The method as defined in claim 1, wherein the gesture element is defined to have a temporal duration.

11. The method as defined in claim 1, wherein the gesture element is defined using at least one gesture component.

12. The method as defined in claim 11, wherein each gesture component has an associated modifier.

13. The method as defined in claim 12, wherein the associated modifier corresponds to a performance extent of the gesture component.

14. The method as defined in claim 1, further comprising the step of:
storing the gesture element and the audio element in a memory;
wherein the gesture element and the audio element are retrieved from the memory by the processing device.

15. The method as defined in claim 1, further comprising the step of:
creating a text file containing the gesture element and the audio element.

16. The method as defined in claim 15, wherein the step of receiving the gesture element and the audio element includes reading the gesture element and the audio element from the text file.

17. The method as defined in claim 1, further comprising the steps of:
receiving a configuration element at the processing device, the configuration element representing a characteristic of the computer generated object, the configuration element being received sequentially with the gesture element and the audio element; and
processing the configuration element in the sequence in which it is received so that the characteristic is generated during the presentation of the computer generated object.

18. The method as defined in claim 19, wherein the characteristic is one of a face type, a voice type, and a speech rate.

19. The method as defined in claim 1, wherein the gesture element is one of a plurality of gesture elements, and wherein the gesture element is defined using another of the plurality of gesture elements.

20. The method as defined in claim 1, wherein the gesture element is processed such that an additional movement is superimposed upon the movement of at least one of the plurality of movable components associated with the gesture element.

21. An apparatus for controlling a presentation of a computer generated object having a plurality of movable components, the apparatus comprising:
a receiver for receiving a gesture element, a associated modifier and an audio element at a processing device, the gesture element representing a gesture involving one or more of the plurality of movable components, the audio element representing an audio signal, the gesture element and the audio element being received in a sequential order, and wherein the associated modifier controls a performance rate of the gesture element or the audio signal, and wherein the sequential order of receipt of the gesture element and the duration modifier and the audio signal determines the timing of the presentation of the gesture element with respect to the audio element including inclusion of the associated modifier; and
a processor for processing the gesture element and the audio element in the sequential order so that each of the plurality of movable components associated with the gesture element are moved to perform the gesture and the audio signal associated with the audio element is generated in accordance with the timing indicated by the sequence order and the associated modifier during a presentation of the computer generated object.

22. The apparatus as defined in claim 21, further comprising means for indicating when the sequential order is to be disregarded so that the gesture and the audio signal are performed simultaneously.

23. The apparatus as defined in claim 21, wherein the computer generated object is a computer generated face.

24. The apparatus as defined in claim 23, wherein the plurality of movable components include facial muscles.

25. The apparatus as defined in claim 23, wherein the plurality of movable components include eyes.

26. The apparatus as defined in claim 23, wherein the plurality of movable components include a head upon which the computer generated face is formed.

27. The apparatus as defined in claim 23, wherein the gesture is a facial expression.

28. The apparatus as defined in claim 21, wherein the audio signal is a speech signal.

29. The apparatus as defined in claim 23, wherein the associated modifier corresponds to a performance extent of the gesture.

30. The apparatus as defined in claim 21, wherein the gesture element is defined to have a temporal duration.

31. The apparatus as defined in claim 21, wherein the gesture element is defined using at least one gesture component.

32. The apparatus as defined in claim 31, wherein each gesture component has an associated modifier.

33. The apparatus as defined in claim 32, wherein the associated modifier corresponds to a performance extent of the gesture component.

34. The apparatus as defined in claim 21, further comprising:
a memory for storing the gesture element and the audio element;
wherein the gesture element and the audio element are retrieved from the memory by the processor.

35. The apparatus as defined in claim 21, further comprising:
a text file containing the gesture element and the audio element.

36. The apparatus as defined in claim 35, wherein the processor reads the gesture element and the audio element from the text file.

37. The apparatus as defined in claim 21, wherein the receiver receives a configuration element at the processing device, the configuration element representing a characteristic of the computer generated object, the configuration element being received sequentially with the gesture element and the audio element, and wherein the processor processes the configuration element in the sequence in which it is received so that the characteristic is generated during the presentation of the computer generated object.

38. The apparatus as defined in claim 37, wherein the characteristic is one of a face type, a voice type, and a speech rate.

39. The apparatus as defined in claim 21, wherein the gesture element is one of a plurality of gesture elements, and wherein the gesture element is defined using another of the plurality of gesture elements.

40. The apparatus as defined in claim 21, wherein the processor processes the gesture element such that an additional movement is superimposed upon the movement of at least one of the plurality of movable components associated with the gesture element.

41. An article of manufacture for controlling a presentation of a computer generated object having a plurality of movable components, the article of manufacture comprising:

a computer readable storage medium; and computer programming stored on the storage medium; wherein the stored computer programming is configured to be readable from the computer readable storage medium by a computer and thereby cause the computer to operate so as to:

receive a gesture element, an associated modifier and an audio element at a processing device, the gesture element representing a gesture involving one or more of the plurality of movable components, the audio element representing an audio signal, the gesture element and the audio element being received in a sequential order, and wherein the associated modifier controls a performance rate of the gesture element or the audio signal, and wherein the sequential order of receipt of the gesture element and the associated modifier and the audio signal determines the timing of the presentation of the gesture element with respect to the audio element including inclusion of the associated modifier; and process the gesture element and the audio element in the sequential order so that each of the plurality of movable components associated with the gesture element are moved to perform the gesture and the audio signal associated with the audio element is generated in accordance with the timing indicated by the sequence order and the associated modifier during a presentation of the computer generated object.

42. The article of manufacture as defined in claim 45, wherein the gesture is performed and the audio signal is generated simultaneously.

43. The article of manufacture as defined in claim 41, wherein the computer generated object is a computer generated face.

44. The article of manufacture as defined in claim 43, wherein the plurality of movable components include facial muscles.

45. The article of manufacture as defined in claim 43, wherein the plurality of movable components include eyes.

46. The article of manufacture as defined in claim 43, wherein the plurality of movable components include a head upon which the computer generated face is formed.

47. The article of manufacture as defined in claim 43, wherein the gesture is a facial expression.

48. The article of manufacture as defined in claim 44, wherein the audio signal is a speech signal.

49. The article of manufacture as defined in claim 45, wherein the associated modifier corresponds to a performance extent of the gesture.

50. The article of manufacture as defined in claim 44, wherein the gesture element is defined to have a temporal duration.

51. The article of manufacture as defined in claim 41, wherein the gesture element is defined using at least one gesture component.

52. The article of manufacture as defined in claim 51, wherein each gesture component has an associated modifier.

53. The article of manufacture as defined in claim 52, wherein the associated modifier corresponds to a performance extent of the gesture component.

54. The article of manufacture as defined in claim 41, further causing the computer to operate so as to:

store the gesture element and the audio element in a memory;

wherein the gesture element and the audio element are retrieved from the memory by the processing device.

55. The article of manufacture as defined in claim 41, further causing the computer to operate so as to:

create a text file containing the gesture element and the audio element.

56. The article of manufacture as defined in claim 55, further causing the computer to operate so as to:

read the gesture element and the audio element from the text file.

57. The article of manufacture as defined in claim 41, further causing the computer to operate so as to:

receive a configuration element at the processing device, the configuration element representing a characteristic of the computer generated object, the configuration element being received sequentially with the gesture element and the audio element; and process the configuration element in the sequence in which it is received so that the characteristic is generated during the presentation of the computer generated object.

58. The article of manufacture as defined in claim 57, wherein the characteristic is one of a face type, a voice type, and a speech rate.

59. The article of manufacture as defined in claim 41, wherein the gesture element is one of a plurality of gesture elements, and wherein the gesture element is defined using another of the plurality of gesture elements.

60. The article of manufacture as defined in claim 41, further causing the computer to operate so as to:

process the gesture element such that an additional movement is superimposed upon the movement of at least one of the plurality of movable components associated with the gesture element.

* * * * *